(12) United States Patent
Hwang et al.

(10) Patent No.: US 8,717,529 B2
(45) Date of Patent: May 6, 2014

(54) DISPLAY APPARATUS AND METHOD OF FABRICATING THE SAME

(75) Inventors: Tae-Hyung Hwang, Seoul (KR); Sang-Il Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/570,591

(22) Filed: Aug. 9, 2012

(65) Prior Publication Data

US 2012/0329185 A1  Dec. 27, 2012

Related U.S. Application Data

(62) Division of application No. 12/405,994, filed on Mar. 17, 2009, now Pat. No. 8,269,942.

(30) Foreign Application Priority Data

Sep. 17, 2008 (KR) .......................... 10-2008-0091227

(51) Int. Cl.
*G02F 1/1333* (2006.01)
*G02F 1/1335* (2006.01)
*B05D 5/06* (2006.01)

(52) U.S. Cl.
USPC ............................. 349/158; 349/106; 438/29

(58) Field of Classification Search
None
See application file for complete search history.

(56) References Cited

U.S. PATENT DOCUMENTS

| | | | |
|---|---|---|---|
| 6,031,512 A | 2/2000 | Kadota et al. | |
| 6,753,047 B1 | 6/2004 | Athey | |
| 7,787,168 B2 | 8/2010 | Park | |
| 8,139,189 B2 * | 3/2012 | Sawatari et al. ............. | 349/125 |
| 2004/0114075 A1 | 6/2004 | Iwasa | |
| 2005/0243247 A1 | 11/2005 | Ryu | |
| 2005/0248699 A1 | 11/2005 | Li et al. | |
| 2005/0253984 A1 | 11/2005 | Kim et al. | |
| 2006/0001825 A1 | 1/2006 | Choi et al. | |
| 2006/0232728 A1 | 10/2006 | Kim | |
| 2007/0252928 A1 * | 11/2007 | Ito et al. ........................ | 349/106 |
| 2007/0252930 A1 | 11/2007 | Tashiro et al. | |
| 2008/0013020 A1 | 1/2008 | Saida et al. | |
| 2008/0273160 A1 | 11/2008 | Kim et al. | |
| 2008/0284971 A1 | 11/2008 | Park et al. | |

* cited by examiner

*Primary Examiner* — Tina Wong
(74) *Attorney, Agent, or Firm* — Innovation Counsel LLP (57) ABSTRACT

A display apparatus that includes a first substrate, a second substrate, and a thin film transistor. The first substrate includes a fiber reinforced plastic substrate and a color filter layer formed on the fiber reinforced plastic substrate. The second substrate faces the first substrate. The thin film transistor is formed on the first substrate.

9 Claims, 8 Drawing Sheets

DISPLAY APPARATUS AND METHOD OF FABRICATING THE SAME

CROSS-REFERENCE TO RELATED APPLICATION

This application is a divisional application of U.S. patent application Ser. No. 12/405,994 filed on Mar. 17, 2009, which claims priority to Korean Patent Application No. 10-2008-0091227 filed on Sep. 17, 2008, the contents of which are herein incorporated by reference in their entireties.

BACKGROUND OF THE INVENTION

1. Field of the Invention

The present invention relates to a display apparatus and a method of fabricating the same. More particularly, the present invention relates to a flexible display apparatus using a substrate planarized with a color filter, and a method of fabricating the same.

2. Description of the Related Art

Demand for flat panel display apparatuses has driven significant research efforts in technologies such as LCDs (liquid crystal displays) and PDPs (plasma display panels). Between these, the LCDs have been a current focus, largely due to their suitability for mass production, relatively simple driving schemes, and high quality images.

The LCD typically includes a liquid crystal layer interposed between two transparent substrates. The LCD drives the liquid crystal layer to adjust light transmittance in each pixel, thereby displaying a desired image.

Further, although LCD technology is commonly applied in the context of flat panel displays, the technology is not limited to that context. In particular, LCD technology can be applied to flexible displays, a field that has recently seen increased demand.

Challenges arise when the liquid crystal display is manufactured using many common plastic substrates. The selection of a substrate is an important factor in processes such as thin film transistor processs, color filter processes, liquid crystal forming processs, and module processs. More specifically, the substrate must be properly selected based on both substrate characteristics and process conditions.

The thermal expansion coefficient and birefringence of the substrate are two factors to be considered when selecting the substrate. If the thermal expansion coefficient of the substrate is high, the substrate will excessively expand or contract during the fabrication process, so that process defects, such as misalignment of the substrates or bending of a carrier, may occur. If the birefringence is high, light leakage may occur during operation, thereby degrading display quality. However, a plastic substrate having a low thermal expansion coefficient and low birefringence has not yet been developed.

Accordingly, it is desirable to develop substrates with a low thermal expansion coefficient and low birefringence. It is further desirable to develop a display apparatus using the above substrate and manufactured with fewer process steps.

SUMMARY OF THE INVENTION

In one aspect of the present invention, a display apparatus includes a first substrate, a second substrate and a thin film transistor. The first substrate includes an FRP (fiber reinforced plastic) substrate and a color filter layer formed on the FRP substrate. The second substrate faces the first substrate. The thin film transistor is formed on the first substrate.

In another aspect of the present invention, a method of fabricating a display apparatus is provided. A first substrate is prepared and a second substrate configured to be positioned facing the first substrate is also prepared. The first substrate is prepared by producing an FRP substrate and forming a color filter layer on the FRP substrate to planarize the FRP substrate.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, a display apparatus according to one embodiment of the present invention will be explained in detail with reference to the accompanying drawings. It should be understood that the present invention is not limited to appended drawings but includes all modifications, equivalents and alternatives within the spirit and scope of the present invention as defined in the following claims. The appended drawings are not necessarily to scale, presenting a somewhat extended or reduced representation of partial elements to illustrate various layers and regions more clearly.

In the figures, reference numerals refer to the same or equivalent parts of the present invention throughout the figures of the drawing. As used herein, the expression, "one layer (film) is formed (disposed) 'on' another layer (film)" includes not only a case where the two layers (films) are in contact with each other but also a case where an additional layer (film) is present between the two layers (film).

Figure 1:
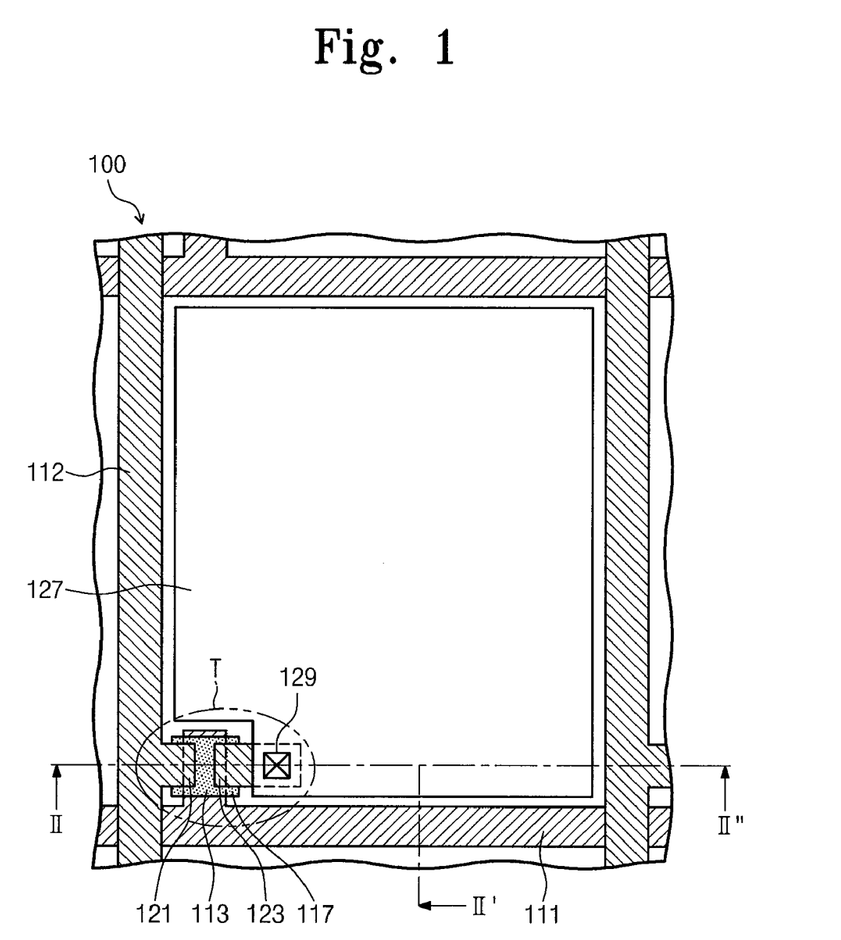
FIG. 1 is a plan view showing a part of an LCD according to a first exemplary embodiment of the present invention.

FIG. 1 is a plan view schematically illustrating a part of a display apparatus according to a first exemplary embodiment of the present invention. In the first exemplary embodiment, an LCD is shown as an example of the display apparatus 100. However, the scope of the present invention is not limited thereto. Further, the display apparatus 100 includes a plurality of pixels that display an image. For the purpose of convenience, FIG. 1 shows only one pixel.

Figure 2A:
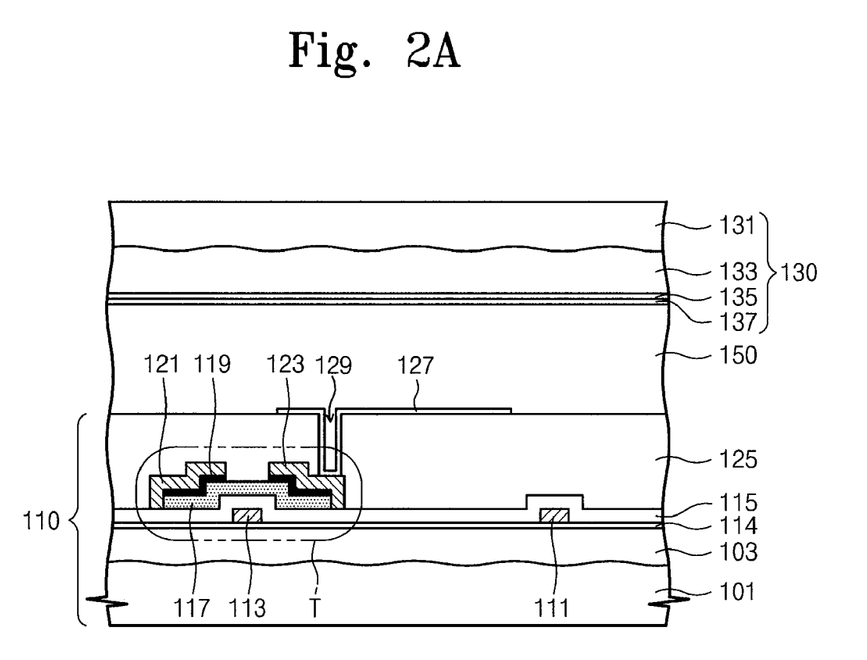
FIG. 2A is a cross-sectional view taken along line II-II' of the substrate shown in FIG. 1.
Figure 2B:
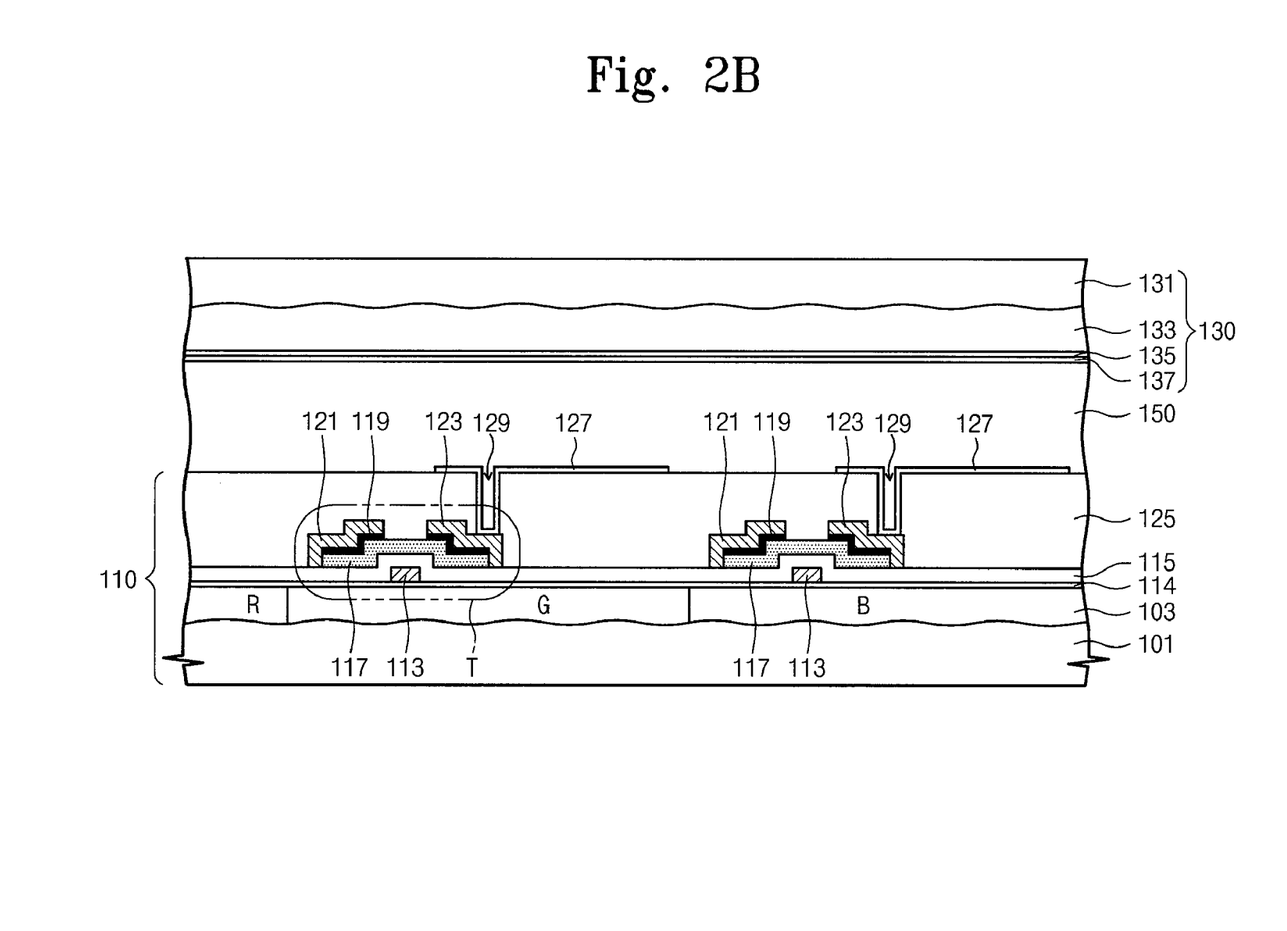
FIG. 2B is a cross-sectional view taken along line II-II" of the substrate shown in FIG. 1 to illustrate a plurality of pixels.

FIGS. 2A and 2B are sectional views schematically illustrating the display apparatus according to the first exemplary embodiment of the present invention. FIG. 2A is a sectional view taken along line II-II' of the substrate shown in FIG. 1, and FIG. 2B is a sectional view taken along line II-II".

The display apparatus includes a plurality of pixels defined by a plurality of gate lines 111 and a plurality of data lines 112 crossing the gate lines 111. For the purpose of convenience, one pixel is representatively described as an example.

As shown in FIGS. 1 and 2, the display apparatus 100 according to the first exemplary embodiment of the present invention includes a first substrate 110, a second substrate 120 facing the first substrate 110, and a liquid crystal layer 150 formed between the first and second substrates 110 and 120. Although the first exemplary embodiment of the present invention includes a liquid crystal layer 150, the scope of the present invention is not limited thereto. Rather, another material, such as an electrophoretic layer, an electrowetting layer, or an organic light emitting layer capable of forming a display substrate can be provided.

The first substrate 110 is prepared as a flexible insulating substrate and includes an FRP (fiber reinforced plastic) substrate 101. A color filter layer 103 is formed on the FRP substrate 101 to planarize the surface of the FRP substrate 101 and adjust a color of transmitted light.

The color filter layer 103 is prepared as an organic layer including an organic substance. In detail, the color filter layer 103 includes a photosensitive organic substance that produces a red color R, a green color G, and a blue color B. The color filter layer 103 allows light, which passes through the FRP substrate 101, to produce a color. In detail, as shown in FIGS. 1 and 2, each pixel may produce one of red, green and blue colors R, G and B, so that a color of an image produced by each pixel is determined.

A first blocking layer 114 is formed on the color filter layer 103 to prevent introduction of gases or impurities from the color filter layer 103 into a thin film transistor T to be formed above the first blocking layer 114. The first blocking layer 114 includes silicon nitride $SiN_x$ or silicon oxide $SiO_2$.

The gate lines 111 and the data lines 112 are arranged on the first blocking layer 114 in longitudinal and transverse directions, to define a pixel area. The thin film transistor T is formed on the pixel area defined by the gate lines 111 and the data lines 112. A pixel electrode 127 is formed in the pixel area. The pixel electrode is connected to the film transistor T to form an electric field together with a common electrode 137 of the second substrate 130, thereby driving liquid crystals.

The thin film transistor T includes a gate electrode 113 connected with the gate line 111, a source electrode 121 connected with the data line 112, and a drain electrode 123 connected with the pixel electrode 127. Further, the thin film transistor T includes a gate insulating layer 115, an active layer 117 and an ohmic contact layer 119. The gate insulating layer 115 insulates the gate electrode 113 from the source and drain electrodes 121 and 123. When a gate voltage is applied to the gate electrode 113, the active layer 117 and the ohmic contact layer 119 form a conductive channel between the source and drain electrodes 121 and 123.

A protective layer 125 is formed on the transistor T. The protective layer 125 is formed with a contact hole 129 that exposes a part of the drain electrode 123, so that the pixel electrode 127 is connected to the drain electrode 123 through the contact hole 129.

The second substrate 130 is prepared as a flexible insulating substrate and includes an FRP substrate 131. A planar organic layer 133 is formed on the FRP substrate 131 to planarize the surface of the FRP substrate 131.

The common electrode 137 is formed on the planar organic layer 133 to form the electric field together with the pixel electrode 127. A second blocking layer 135 is formed between the planar organic layer 133 and the common electrode 137 to prevent gas or impurities from being introduced from the planar organic layer 133. The second blocking layer 135 includes silicon nitride $SiN_x$ or silicon oxide $SiO_2$.

According to the exemplary embodiment described above, the two substrates 110 and 130 include flexible FRP substrates 101 and 131, respectively. Even though conventional plastics have some flexibility, FRP is employed here because conventional plastics are often not suitable for a substrate due to their high thermal expansion coefficient and birefringence. If the temperature expansion coefficient is higher than a certain value, the substrate will expand/contract excessively during fabrication, so that process defects, such as misalignment or bending, may be created. Further, if the birefringence is higher than a certain value, light leakage may occur even with liquid crystal, causing degradation of display quality. Thus, FRP is preferable for at least some embodiments. Accordingly, FRP, which is commonly fabricated by impregnating glass fiber or yarn, or cloth including the glass fiber, with organic resin such as epoxy resin, is used as material of the substrate in the embodiments described herein.

Table 1 below represents a misalignment result when FRP is used for the substrate. More specifically, Table 1 shows misalignment values when a thin film transistor is formed on a 7-inch FRP substrate. In Table 1, the first misalignment degree denotes a misalignment degree between the gate electrode and the active layer, while the second misalignment degree denotes a misalignment degree between the gate electrode and the source/drain electrodes.

TABLE 1

|  |  | First misalignment degree (μm) | | Second misalignment degree (μm) | |
|---|---|---|---|---|---|
|  | Measurement point | Up and down | Right and left | Up and down | Right and left |
| Embodiment 1 | 1 | 0 | 0 | 0 | 0 |
|  | 2 | 0 | 0 | 0 | 0 |
|  | 3 | 0 | 0 | 0 | 0 |
|  | 4 | 0 | 0 | 0 | 0 |
| Embodiment 2 | 1 | 0 | 0 | 0 | 0 |
|  | 2 | 0 | 0 | 0 | 0 |
|  | 3 | 0 | 0 | 0 | 0 |
|  | 4 | 0 | 0 | 0 | 0 |
| Embodiment 3 | 1 | 0 | 0 | 0 | 0 |
|  | 2 | 1 | 0 | 1 | 0 |
|  | 3 | 1 | 0 | 2 | 0 |
|  | 4 | 0 | 0 | 0 | 0 |
| Embodiment 4 | 1 | 0 | 0 | 0 | 0 |
|  | 2 | 0 | 0 | 1 | 1 |
|  | 3 | 1 | −1 | 1 | 0 |
|  | 4 | 0 | −1 | 1 | 0 |
| Embodiment 5 | 1 | 0 | 0 | 0 | 0 |
|  | 2 | 0 | 0 | 0 | 0 |
|  | 3 | 0 | 0 | 0 | 0 |
|  | 4 | 0 | 0 | 0 | 0 |

As can be seen from above table 1, use of an FRP substrate here yields a very low misalignment degree of about 0 μm to about 1 μm, even if a plurality of layers are formed thereon. Accordingly, an FRP substrate is suitable for an LCD substrate. Further, a conventional polyethersulfone substrate produces a misalignment degree of about 30 μm in the same conditions.

Figure 3:
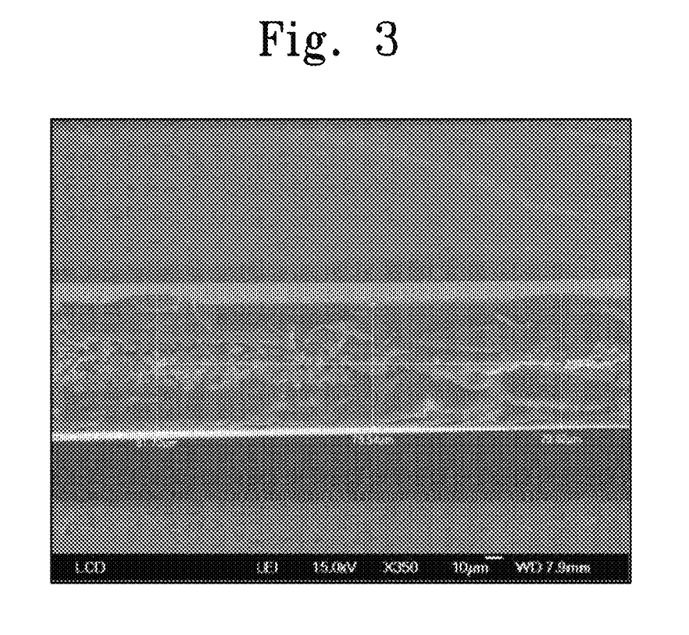
FIG. 3 is a photograph showing a step difference of an FRP substrate.
Figure 4:
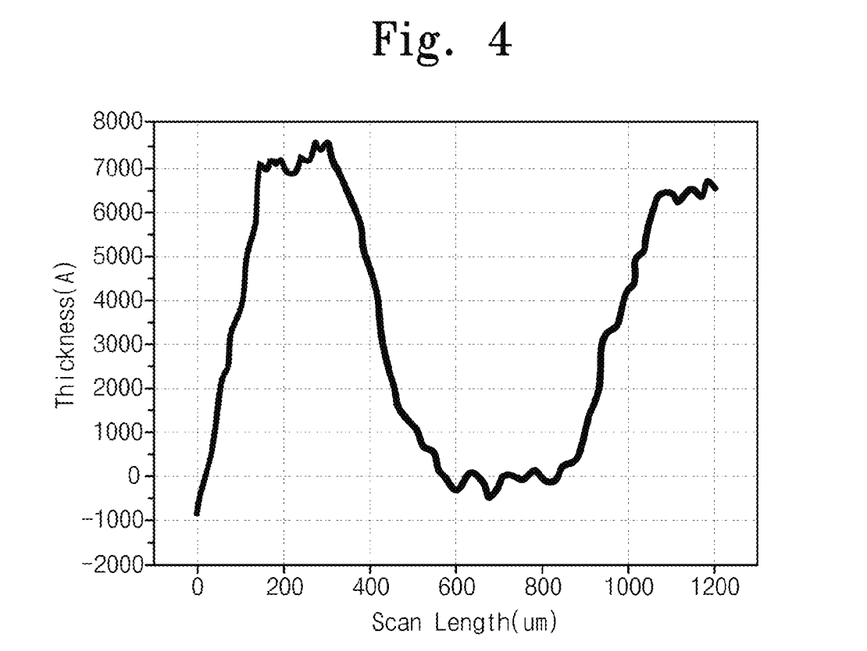
FIG. 4 is a graph showing thickness variation in a part of an FRP substrate when thickness of the FRP substrate is normalized to have an average thickness of 0.

However, although the FRP substrate has superior physical properties as described above, since the FRP substrate is commonly fabricated by impregnating fibers with organic resin, the thickness of such substrates may vary, especially in regions where fibers are aggregated or overlap each other. FIG. 3 is a photograph showing thickness differences in an FRP substrate, and FIG. 4 is a graph showing thickness variations in a part of the FRP substrate when thickness of the FRP substrate is normalized to an average thickness of 0. Referring to FIG. 4, thickness variations of about 7000 Å to about 8000 Å exist in the portion of the FRP substrate shown.

The thickness differences may cause problems when devices are formed over them, possibly resulting in display errors or defects in the thin film transistors that are formed. Embodiments of the invention thus seek to reduce or eliminate this problem by covering the FRP substrate with the organic layer, thus smoothing out the surface of the FRP substrate and reducing thickness differences. Preferably, the organic layer has thickness of about 1.4 μm or more, which is at least two times thicker than many thickness variations, so as to sufficiently cover.

Figure 5:
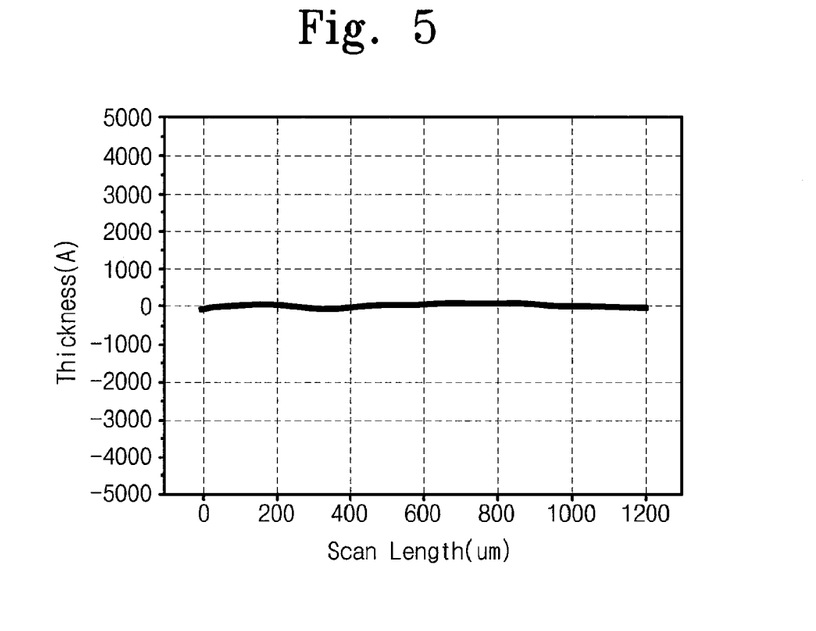
FIG. 5 is a graph showing thickness variation in a surface of an FRP substrate when an organic layer is formed on the FRP substrate of FIG. 4.

FIG. 5 is a graph showing thickness variations after the organic layer is formed on the FRP substrate of FIG. 4. Referring to FIG. 5, a planar organic layer having thickness variation less than 500 Å is formed. As can be seen, the organic layer greatly reduces thickness variations, effectively planarizing the surface of the FRP substrate.

In the present exemplary embodiment, a color filter layer is used as the planarizing layer. That is, the color filter layer serves as a color filter as well as a planarizing layer for the FRP substrate. The use of a single layer that acts as both color filter and planarizer simplifies the fabrication process, compared to the use of two separate layers. Further, if a separate planarizing organic layer is omitted, an optical transmission path can be shortened and thus optical transmittance and luminance can be improved.

Since the color filter layer should have sufficient thickness to compensate for roughness of the FRP substrate, it is often preferred that the color filter layer have a thickness of about 1.4 μm or more, similar to that of the organic layer. When the color filter layer has a thickness of less than about 1.4 μm, the color filter may not be thick enough to smooth out irregularities in the surface of the FRP substrate. It is also preferred that the color filter layer have a thickness of about 6 μm or less, as light transmittance may be considerably reduced and color reproducibility may be lowered when the color filter layer has very high thickness.

The color filter layer may use material such as an acryl compound, Benzene Cyclobutane (BCB), or polyimide. Preferably, the color filter layer uses a photosensitive organic substance such as a photosensitive acryl compound. The photosensitive organic substance can be patterned using a photolithography process to provide the color filter layer. However, material for the color filter layer is not limited to photosensitive substances. More specifically, any suitable material, photosensitive or not, can be used as material for the color filter layer, although it is preferable that the material be amenable to formation of a color filter layer through inkjet or printing methods.

The organic layer may use an acryl compound, Benzene Cyclobutane (BCB), or polyimide.

The display apparatus 100 is driven by applying a common voltage to the common electrode 137, and applying a pixel signal from the data line 112 to the pixel electrode 127. This forms an electric field between the common electrode 137 and the pixel electrode 127, which aligns liquid crystals of the liquid crystal layer 150 to change the amount of transmitted light, so that an image is displayed.

Figure 6:
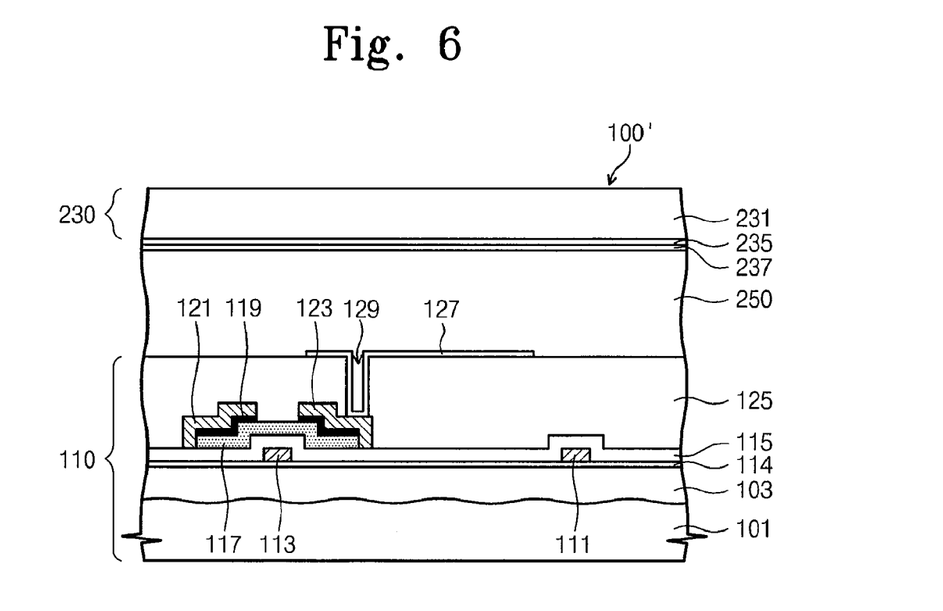
FIG. 6 is a sectional view showing an LCD according to a second exemplary embodiment of the present invention.

FIG. 6 is a sectional view showing an LCD according to a second exemplary embodiment of the present invention. In the second exemplary embodiment, only features different from those of the first exemplary embodiment will be described and description of elements the same as those of the first exemplary embodiment will be omitted in order to avoid redundancy. For the convenience of explanation, the same reference numerals are assigned to the same elements and detailed description thereof will be omitted.

Referring to FIG. 6, the first substrate 110 includes an FRP substrate 101, a planar color filter layer 103 formed on the FRP substrate 101, and a thin film transistor T formed on the planar color filter layer 103. The thin film transistor T is connected to the pixel electrode 127 that forms an electric field together with a common electrode 237 on a second substrate 230.

The second substrate 230 includes a polyethersulfone substrate 231. The common electrode 237 is formed on the polyethersulfone substrate 231.

The first blocking layer 114 is formed between the color filter layer 103 and the thin film transistor T, and a second blocking layer 235 is formed between the polyethersulfone substrate 231 and the common electrode 237, each of which prevent introduction of impurities. Since the polyethersulfone substrate 231 has very low birefringence and high transmittance as well as high planarity, the polyethersulfone substrate 231 can be used for an LCD substrate. However, since the polyethersulfone substrate 231 has a high thermal expansion coefficient, the polyethersulfone substrate 231 can be used with the second substrate 230, rather than the first substrate 110. More specifically fabrication of thin film transistors T on the first substrate 110 typically requires high temperatures, rendering polyethersulfone unsuitable for use due to its excessive expansion. However, the second substrate 130 does not typically require such high temperature processes, allowing polyethersulfone to be used there.

Furthermore, fewer fabrication processes are usually performed on the second substrate 130, reducing the number of thermal cycles it undergoes and therefore reducing thermal hysteresis. Thus, even if the polyethersulfone substrate 231 is used for the second substrate 230, the display quality of the LCD 100' is not typically affected. Further, the color filter layer 103 is formed on the first substrate 110, so that alignment is easily achieved between the first and second substrates 110 and 230. This results in a reduction in the number of process defects, even if thermal expansion coefficient is high.

In this second exemplary embodiment, the organic layer is removed from the second substrate 230, so that thickness of the second substrate 230 can be reduced and luminance reduction by the organic layer can be prevented. Thus, this embodiment yields increased luminance as compared with the first exemplary embodiment.

According to the present embodiment, the polyethersulfone substrate 231 is used as a transparent substrate. Further, a plastic substrate such as polycarbonate substrate or a polyethylene terephthalate substrate can also be used. Furthermore, in the case of a transparent substrate, which often requires planarization due to a concave-convex section on the surface thereof, a substrate including another material can be used. However, the scope of the present invention is not limited thereto. Rather, the invention contemplates use of any material suitable for a transparent substrate.

Hereinafter, a method of fabricating the LCD according to the exemplary embodiment will be described with reference to FIGS. 7A to 7F. The first substrate 110 is prepared by forming the planar color filter layer 103 on the FRP substrate 101. Then the second substrate 130 is prepared and aligned facing the first substrate 110, and the liquid crystal layer 150 is injected between the first substrate 110 and the second substrate 130.

Figure 7A:
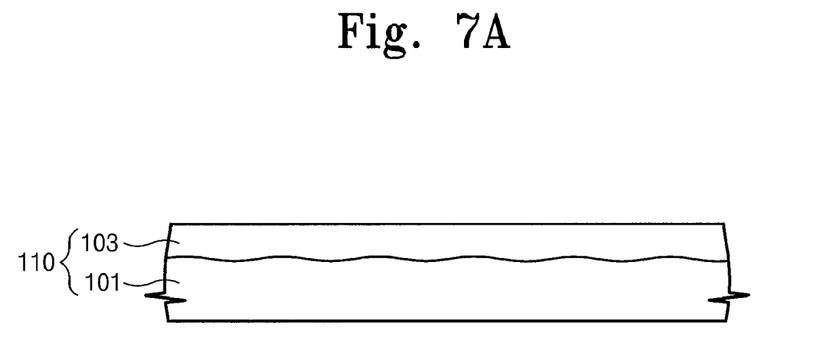
FIGS. 7A to 7F are cross-sectional views sequentially illustrating a method of fabricating an LCD according to an exemplary embodiment of the present invention.

First, as shown in FIG. 7A, the substrate, which has color filter layer 103 on the FRP substrate 101, is prepared. The FRP substrate 101 is prepared by producing a preliminary substrate. In order to provide the preliminary substrate, glass fiber, yarn or cloth is impregnated with organic resin such as epoxy resin. Then, the preliminary substrate is compressed by using a press plate having a flat surface. And then the compressed preliminary substrate is cured with heat. The compression and the curing can be performed in a single process. Preferably, the glass fiber is used in the form of a yarn.

Next, color filter layer 103 is formed on the FRP substrate 101. The color filter layer 103 can be formed by subjecting photosensitive material having a color to a photolithography process. However, the scope of the present invention is not limited thereto. The color filter layer 103 can be formed using a printing or inkjet method if necessary.

Figure 7B:
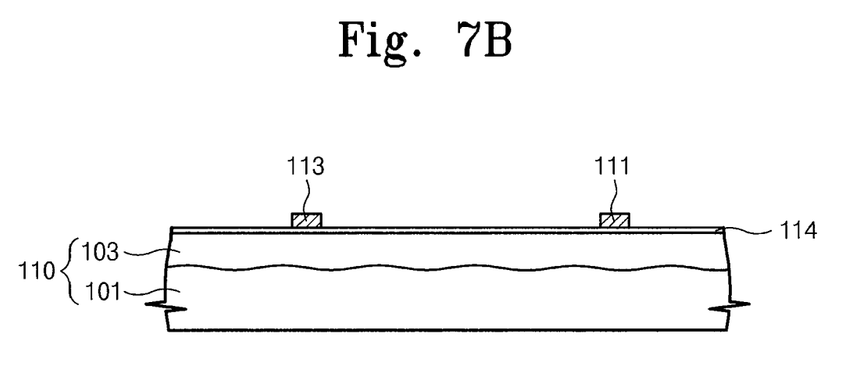

Then, as shown in FIG. 7B, the first blocking layer 114 is formed on the color filter layer 103 by using a deposition process such as a chemical vapor deposition. The gate electrode 113 and the gate line 111 are formed on the FRP substrate 101 over the color filter layer 103 and first blocking layer 114. The gate electrode 113 and the gate line 111 can be formed by depositing a first conductive layer on the entire surface of the first substrate 110 and patterning the first conductive layer by using a photolithographic process.

Figure 7C:
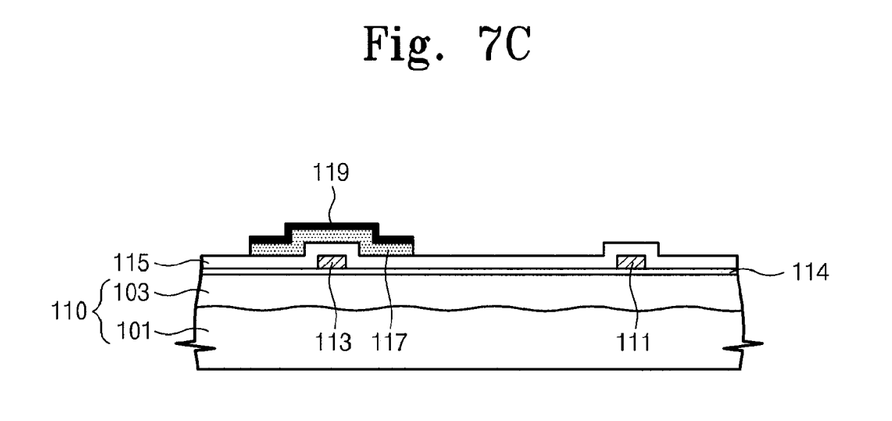

Thereafter, as shown in FIG. 7C, the gate insulating layer 115, an amorphous silicon layer, and an n-F amorphous silicon layer are sequentially deposited on the entire surface of the first substrate 110. The amorphous silicon layer and the n+ amorphous silicon layer are selectively patterned, using photolithography, to form the ohmic contact layer 119, which allows ohmic contact to be formed between the active layer 117 and the source and drain electrodes 121 and 123.

Figure 7D:
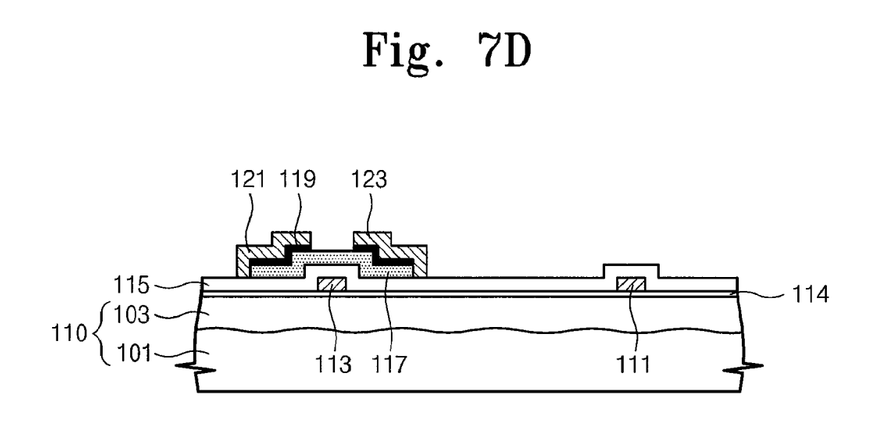

Next, as shown in FIG. 7D, a second conductive layer is deposited on the entire surface of the first substrate 110, over the active layer 117 and the ohmic contact layer 119. This second conductive layer is selectively patterned using photolithography, to form the source and drain electrodes 121 and 123. The source electrode 121 serves as a part of the data lines 112, while the data lines 112 define a corresponding pixel area by crossing the gate lines 111.

The active layer 117, the ohmic contact layer 119, and the source and drain electrodes 121 and 123 can be formed via multiple photolithographic processes. However, the scope of the present invention is not limited thereto. For example, the active layer 117, the ohmic contact layer 119, and the source and drain electrodes 121 and 123 can be formed in a single process with a diffraction mask or half tone mask through photolithography.

Figure 7E:
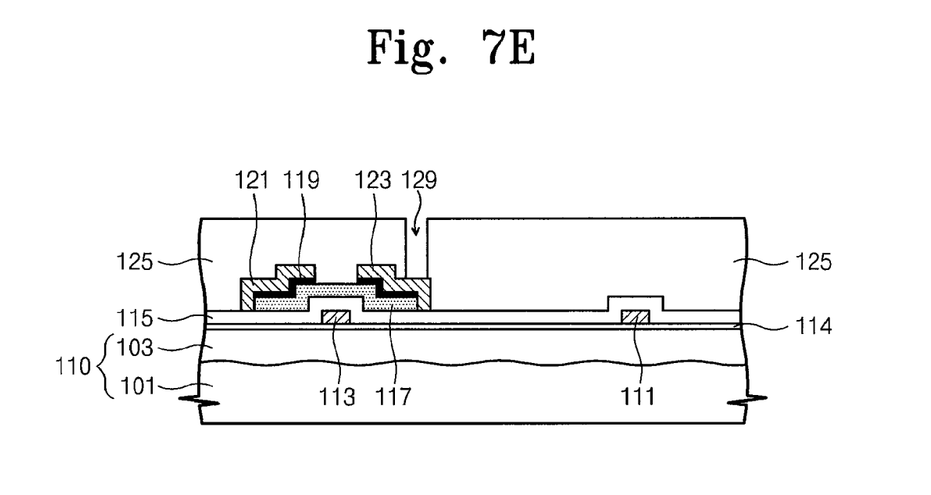

Next, as shown in FIG. 7E, protective layer 125 is deposited on the entire surface of the first substrate 110, and over the source and drain electrodes 121 and 123. A part of the protective layer 125 is removed using photolithography, to form the contact hole 129 that exposes a part of the drain electrode 123.

Figure 7F:
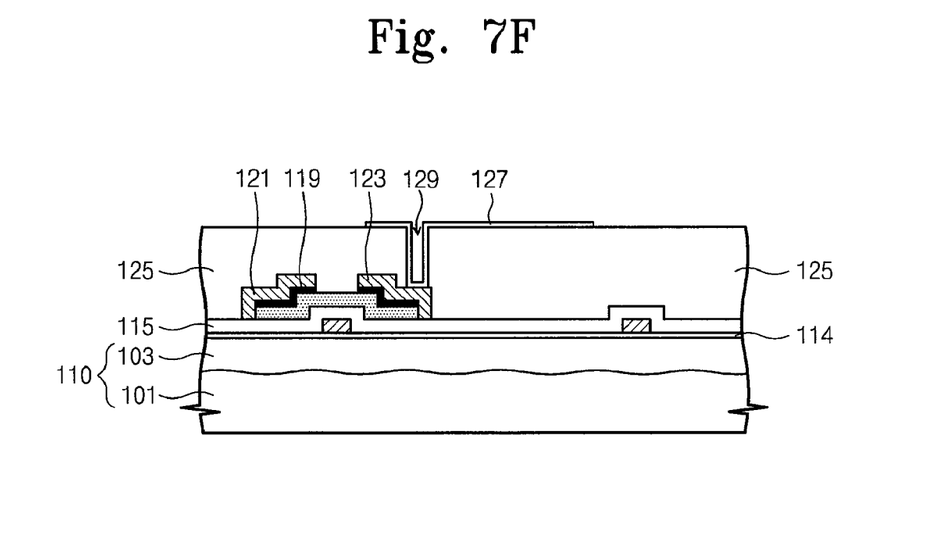

Thereafter, as shown in FIG. 7F, transparent conductive material is deposited on the entire surface of the first substrate 110, and is selectively patterned using photolithography, to form pixel electrode 127. The pixel electrode 127 is connected to the drain electrode 123 through the contact hole 129.

The second substrates 130 and 230 in the exemplary embodiment of the present invention are not shown. However, similar to that shown in FIG. 7A, the second substrate 130 is formed by preparing the FRP substrate 131, and forming the planar organic layer 133 on the FRP substrate 131. The second substrate 230 is prepared as the polyethersulfone substrate 231. The second blocking layers 135 and 235 are formed on the FRP substrate 131 and the polyethersulfone substrate 231, respectively. Next, the common electrodes 137 and 237 are formed on second blocking layers 135 and 235, respectively.

Then, the first substrate 110 is aligned to face the second substrate 130 or the second substrate 230, and the liquid crystal layer (not shown) is formed between the first substrate 110 and the second substrate 130 or 230, thereby completing fabrication of the LCD.

As a result, an LCD according to the present invention can display a high quality image by increasing luminance while efficiently planarizing the substrate. Further, since the polyethersulfone substrate can be easily fabricated and does not require an additional planarization process, the LCD manufacturing process can be simplified, the manufacturing efficiency can be improved, and the manufacturing cost can be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. For example, although not shown in another embodiment, in the case of an IPS (in-plane switching) liquid crystal display panel, a common electrode and a pixel electrode can be formed on the same plane on a thin film transistor substrate. In such a case, a substrate having a planar color filter layer can be used.

What is claimed is:

1. A method of fabricating a display apparatus, the method comprising:
   preparing a first substrate; and
   preparing a second substrate configured to overlap the first substrate,
   wherein preparing of the first substrate comprises:
      preparing a fiber reinforced plastic substrate; and
      forming a color filter layer on the fiber reinforced plastic substrate, and
   wherein preparing of the fiber reinforced plastic substrate comprises:
      impregnating a fiber with a resin to prepare a preliminary substrate;
      compressing the preliminary substrate using a press plate that has a substantially flat surface; and
      curing the preliminary substrate.

2. The method of claim 1, wherein the color filter layer is configured to planarize the fiber reinforced plastic substrate.

3. The method of claim 2, wherein the fiber comprises a glass fiber.

4. The method of claim 2, wherein the compressing and the curing are performed in a single process.

5. The method of claim 1, wherein the color filter layer is formed using a photolithography process.

6. The method of claim 1, wherein the preparing a first substrate further comprises forming a thin film transistor on the color filter layer.

7. The method of claim 1, wherein the preparing a first substrate further comprises forming a blocking layer on the color filter layer before the thin film transistor is formed.

8. The method of claim 7, wherein the blocking layer includes silicon nitride or silicon oxide.

9. The method of claim 7, wherein the blocking layer is formed through chemical vapor deposition.

* * * * *